(12) United States Patent
Gebhart et al.

(10) Patent No.: US 10,330,158 B2
(45) Date of Patent: Jun. 25, 2019

(54) TORSIONAL VIBRATION DAMPER AND TORSIONAL VIBRATION DAMPER SYSTEM

(71) Applicant: Kendrion (Markdorf) GmbH, Markdorf (DE)

(72) Inventors: Manfred Gebhart, Constance (DE); Alexander Grischin, Constance (DE)

(73) Assignee: Kendrion (Markdorf) GmbH, Markdorf (DE)

( * ) Notice: Subject to any disclaimer, the term of this patent is extended or adjusted under 35 U.S.C. 154(b) by 0 days.

(21) Appl. No.: 15/316,656

(22) PCT Filed: Jun. 3, 2015

(86) PCT No.: PCT/EP2015/062428
§ 371 (c)(1),
(2) Date: Dec. 6, 2016

(87) PCT Pub. No.: WO2015/185654
PCT Pub. Date: Dec. 10, 2015

(65) Prior Publication Data
US 2017/0138405 A1    May 18, 2017

(30) Foreign Application Priority Data

Jun. 6, 2014   (DE) .................. 20 2014 102 645 U

(51) Int. Cl.
| | | |
|---|---|---|
| *F16D 3/12* | (2006.01) | |
| *F16F 15/18* | (2006.01) | |
| *F16H 55/36* | (2006.01) | |

(52) U.S. Cl.
CPC ............... *F16D 3/12* (2013.01); *F16F 15/18* (2013.01); *F16H 55/36* (2013.01); *F16H 2055/366* (2013.01)

(58) Field of Classification Search
CPC ............ F16H 55/36; F16H 2055/366; F16D 27/112; F16D 2027/007; F16D 43/18
(Continued)

(56) References Cited

U.S. PATENT DOCUMENTS 3,478,609 A  *  11/1969  Beindorf ................... F16H 7/02
                                                474/142
3,762,516 A  *  10/1973  Matsushita ........... F16D 27/112
                                                192/84.94
(Continued)

FOREIGN PATENT DOCUMENTS

| EP | 1 444 767 B1 | 8/2004 |
|---|---|---|
| JP | 2010144892 A | 7/2010 |

(Continued)

OTHER PUBLICATIONS

International search report for application No. PCT/EP2015//062428 dated Oct. 6, 2015.

*Primary Examiner* — Henry Y Liu
(74) *Attorney, Agent, or Firm* — Bachman & LaPointe, PC

(57) ABSTRACT

A device (1) for transmitting torque for driving an auxiliary unit, in particular an alternator, preferably in a motor vehicle, and for damping torsional vibrations, said device comprising driving means (2) that can be driven about an axis of rotation (4) by an internal combustion engine, and output drive means (3) rotatable about the axis of rotation (4) that are arranged and designed for driving the auxiliary unit, wherein at least one axial front face of the driving means (2) and/or of the output drive means (3) carries permanent magnet means (10, 11) which allow torques to be transmitted between the driving means (2) and the output drive means (3) and which allow torsional vibrations to be dampened, the poles (13, 14, 15, 16) of the permanent magnet means (10, 11) being arranged in at least one radial plane, characterized
(Continued)

in that the permanent magnet means (10, 11) comprise a plurality of permanent magnet elements (17) arranged next to each other in the circumferential direction, these permanent magnets (17) adjoining each other, in particular being directly in contact or fixed to each other via an adhesive layer of less than 2 mm thickness, and/or that the permanent magnet means (10, 11) comprise at least one shaped part made of plastic, in particular an injection-molded part made of plastic and/or a shaped part made of a sintered material, and/or the permanent magnet means (10, 11) are arranged on a geometrical, preferably concentric annular orbit, which deviates from a concentric circular orbit, preferably an elliptic orbital (27, 28).

16 Claims, 4 Drawing Sheets

(58) Field of Classification Search
USPC ................................................ 474/94, 70
See application file for complete search history.

(56) References Cited

U.S. PATENT DOCUMENTS

| | | | | |
|---|---|---|---|---|
| 4,987,333 A * | 1/1991 | Noguchi | ............ | H02K 7/1004 310/268 |
| 5,361,883 A * | 11/1994 | Yamamoto | ............ | F16D 27/112 192/84.961 |
| 6,494,799 B1 * | 12/2002 | Ochiai | ............ | F16D 7/044 464/73 |
| 7,712,592 B2 * | 5/2010 | Jansen | ............ | F16D 3/52 192/415 |
| 8,632,431 B2 * | 1/2014 | Pflug | ............ | F16H 55/36 474/94 |
| 8,951,153 B2 * | 2/2015 | Ishida | ............ | F16D 43/18 474/74 |
| 2008/0312014 A1 * | 12/2008 | Stief | ............ | F16F 15/123 474/94 |
| 2010/0130319 A1 * | 5/2010 | Nicolai | ............ | B62M 9/04 474/75 |
| 2011/0193431 A1 * | 8/2011 | Jo | ............ | H02K 7/1004 310/51 |
| 2012/0100945 A1 * | 4/2012 | Ishida | ............ | F16D 43/18 474/69 |
| 2012/0295746 A1 * | 11/2012 | Cali | ............ | F16D 3/02 474/94 |
| 2012/0322594 A1 * | 12/2012 | Kitamura | ............ | B62J 6/06 474/110 |
| 2014/0023527 A1 * | 1/2014 | Roby | ............ | F16D 27/11 417/362 |
| 2016/0195162 A1 * | 7/2016 | Manzoor | ............ | F16F 6/00 474/94 |

FOREIGN PATENT DOCUMENTS

| | | |
|---|---|---|
| JP | 2010174908 A | 8/2010 |
| JP | 2011047434 A | 3/2011 |

* cited by examiner

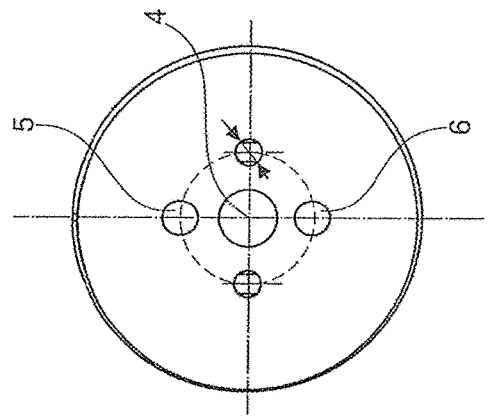
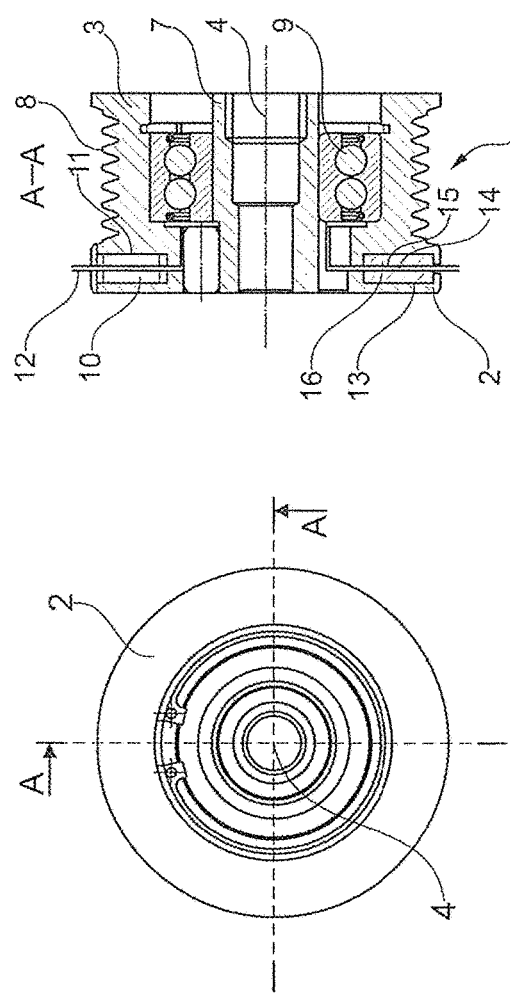
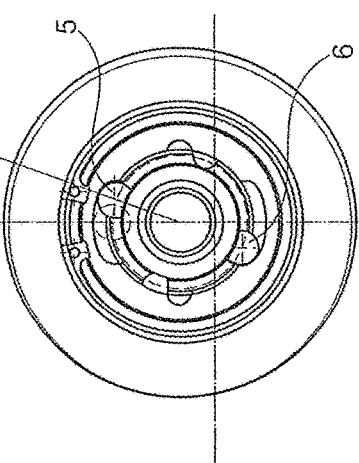

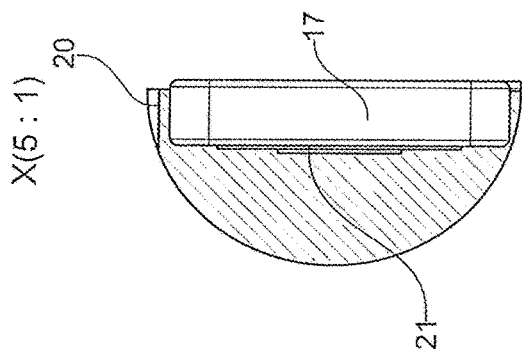
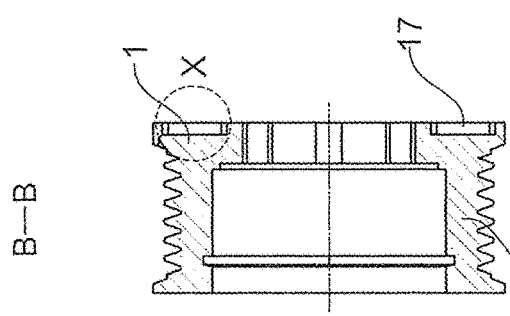
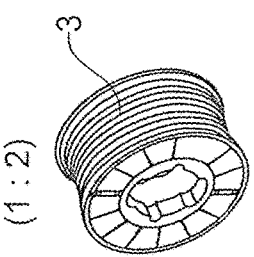
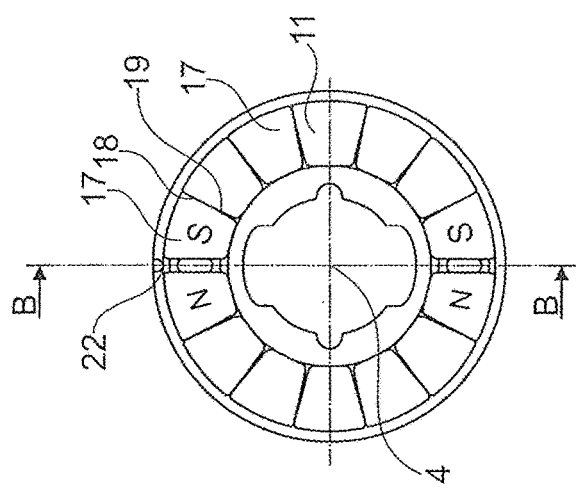

TORSIONAL VIBRATION DAMPER AND TORSIONAL VIBRATION DAMPER SYSTEM

BACKGROUND OF THE INVENTION

The invention relates to a device for transmitting torque, for driving an auxiliary unit, in particular an alternator, preferably in a motor vehicle, and for damping torsional vibrations. The invention also relates to a system having such a torque transmission device.

Document EP 1 444 767 B1 discloses a torsional vibration damper for transmitting a torque from a drive shaft driven by an internal combustion engine onto an auxiliary unit in a motor vehicle. The known torsional vibration damper is characterized in that, to provide torque transmission, the circular-cylindrical permanent magnets provided on drive means as well as on drive output means are arranged on two opposite circular orbits, each oriented concentric to the axis of rotation, wherein the poles of the permanent magnets point in the axial direction, i.e. towards the front faces of the drive or output drive means respectively. The permanent magnets are in practice inserted in frontal grooves for fixing to the drive and output drive means and encapsulated there with a potting compound, which fills up the free spaces of the permanent magnets which are spaced apart in the circumferential direction. The known torque transmission device has been proven in practice.

SUMMARY OF THE INVENTION

Efforts are being made, however, to increase the maximum transmissible torque values for the same or minimized installation space (the object). In addition or as an alternative, efforts are also being made towards simplifying the design. Furthermore, in addition to or alternatively the installation space should ideally be optimized (minimized) and/or the magnetic flux characteristics controlled.

The object of the invention also includes specifying a system comprising a torsional vibration damper and an auxiliary unit, in particular an alternator in a motor vehicle. In particular, the torsional vibration damper is intended to be suitable for driving an alternator, which is particularly sensitive to torsional vibrations.

This object is achieved in respect of the torsional vibration damper by the features disclosed herein, and in respect of the system by the features also disclosed herein. Advantageous embodiments of the invention are described in the dependent claims. The scope of the invention covers any and all combinations of at least two features disclosed in the description, the claims and/or the drawings.

The device designed according to the concept of the invention for transmitting torques and for damping torsional vibrations is specifically designed for transmitting torques for driving an auxiliary unit, in particular in a motor vehicle, wherein in the installed condition, drive means of the device are driven using an internal combustion engine, i.e. rotated about a rotational axis. The torque is transmitted from the drive means to output drive means that are coupled to the auxiliary unit, in particular via a belt drive, which are rotated about the same rotational axis. The output drive means and the drive means can be rotated relative to each other about the aforementioned common rotational axis, to enable torsional vibrations to be damped. If necessary, for limiting the relative angle of rotation at least one mechanical interlocking driving connection can be provided, preferably a plurality of mechanical interlocking driving connections spaced apart in the circumferential direction, wherein in the case of multiple interlocking driving connections it is preferred that these are arranged at the same radius with respect to the axis of rotation. The permanent magnet means are oriented axially, i.e. the poles (pole faces) of the permanent magnet means are located in a radial plane extending perpendicular to the axis of rotation, and are thus aligned axially or extend parallel to the front faces of the drive means and/or output drive means. In order to be able to transmit particularly large torques it is particularly advantageous if on both the drive means and the output drive means permanent magnet means are provided which, in particular, are located opposite each other, maintaining an axial gap. It is also conceivable, however, that either only the output drive means or only the drive means have permanent magnet means and the respectively opposite component or rotating part opposite the permanent magnet means comprises a material which conducts magnetic flux, in particular in the form of an insert, such as a steel insert.

The invention is characterized by three options to be explained in the following, which can be realised either individually or in any desired combination to achieve their corresponding objects.

According to a first option for increasing the maximum transmissible torque (with the same or even reduced assembled size), to increase the magnetic flux density it is provided that the permanent magnet elements forming the individual permanent magnet means, which can be formed, for example, from a permanently magnetic solid material, preferably a hard magnetic material, in particular from a rare-earth material, are arranged close to each other in the circumferential direction, i.e. adjacent to each other. For this purpose, two permanent magnets that are adjacent in the circumferential direction directly adjoin each other with one contact surface each. An embodiment is also conceivable in which the permanent magnet elements are fixed to each other using a thin layer of adhesive, of preferably less than 2 mm, more preferably less than 1 mm thickness in the circumferential direction. Due to the close packing of the permanent magnet elements, the installation space available on the front face for the permanent magnet means is optimally utilized, which means that compared with the prior art, higher magnetic flux densities can be achieved for the same surface area of the front face of the drive means and/or output drive means. In particular, the free surfaces, which in the prior art are filled with potting compound, are optimally utilized. The described embodiment with permanent magnet elements that are adjacent to each other in the circumferential direction, i.e. either directly adjoining each other or minimally spaced apart via an adhesive layer of preferably less than 2 mm, in particular less than 1 mm, make it possible also to switch to using a material which differs from permanent magnetic solid material. In this way, the permanent magnet elements can also be designed with weaker magnetic material in comparison to hard magnetic material, for example from sintered material. It is also conceivable to provide permanent magnet elements as shaped parts made of plastic, in particular injection-moulded parts made of plastic, wherein the shaped plastic parts contain permanent magnetic particles which are suspended or fixed in a plastic matrix.

As a second option, which can be realised in addition to the first and/or a third option to be described below, or alternatively in isolation, it is provided that the permanent magnet means comprise at least one shaped part made of plastic, which contains permanent magnetic particles. The shaped plastic part can be designed, for example, as an injection-moulded part made of plastic. It is also conceivable for the permanent magnet means to comprise at least one shaped part made of a sintered material, composed of permanent magnetic particles. Such a design of the permanent magnet means is not known in torque vibrational dampers, in particular since shaped magnetic parts are characterized by a low magnetic force, which results in a comparatively low maximum transmissible torque. However, the shaped parts, in particular the shaped parts made of plastic or shaped parts made of sintered material, can be produced at low cost in almost any desired shape, so that in this way also, the available end faces can be optimally utilized as "magnetic surfaces" and, because of the resulting large magnetic surfaces, the result is that even comparatively large torques can be transmitted. It is very particularly preferable that the shaped parts are designed such that they each extend over a peripheral angle of at least 60°, more preferably over at least 90°, most particularly preferably at least over at least approximately 180°. It is also possible for the shaped parts to be designed as an at least approximately complete (closed) ring, in order thus to optimally utilize the available installation space and to substantially simplify the installation, since substantially fewer individual parts have to be installed than in the prior art.

In accordance with a third option, which can be realised in addition to the first and/or second option or in isolation, it is provided that the permanent magnet means, in particular permanent magnet elements of the permanent magnet means, are arranged on a geometrical annular orbit which deviates from a concentric circular orbit, in particular on an annular orbit which is concentric to the axis of rotation. An arrangement which has proved to be particularly preferable is one in which the permanent magnet means, in particular the permanent magnet elements which form the permanent magnetic means, are arranged on an elliptical orbit, the centre of the ellipse preferably being penetrated by the common axis of rotation of the output drive means and drive means, in particular at least one drive disc and at least one output drive disc. The geometric face centres of the pole surfaces of the permanent magnet means are preferably located on the abovementioned annular orbit. If the permanent magnet means are implemented both on the output drive means and on the drive means, it is preferred that identical annular orbits, in particular two elliptical orbits, are provided opposite each other there. The implementation of annular orbits which deviate from a concentric circular orbit, in particular elliptical orbits, provides another means of optimally utilizing the available installation space. It is also possible to arrange the permanent magnet means radially a comparatively far out on the drive and/or output drive means, resulting in a large transmissible torque. At the same time, due to the annular orbit which deviates from a concentric circular orbit, in particular the elliptical orbit, space is created for the optional arrangement of interlocking driving connections already mentioned, for limiting the relative angle of rotation.

A particularly preferred embodiment variant of the invention in which the permanent magnet means, in particular individual permanent magnet elements, are adhesively bonded to the drive means and/or the output drive means (depending on where the permanent magnet means are to be provided), in particular in a frontal, preferably circumferential groove or other cutout/recess. This groove may be, in accordance with a first alternative, a concentric circular or partially circular groove. It is alternatively conceivable to implement a groove shape which deviates from a concentric circular groove, in particular a partially elliptical groove or a completely elliptical groove. To implement an adhesive joint for fixing the permanent magnet means, a tiered groove shape is preferably provided in a frontal recess, in particular in a frontal groove, wherein the permanent magnet means are preferably supported directly on the drive or output drive means in one region of the groove and in a further, in particular central region of the groove, are spaced apart from a recessed groove base via the adhesive layer. In addition or as an alternative to adhesive bonding, in particular with a thin layer of adhesive of preferably less than 2 mm, more preferably less than 1 mm thickness, it is preferable to mechanically fix the permanent magnet means to the output drive means and/or the drive means, in particular by caulking, which is particularly preferred in the case of an arrangement of the permanent magnet means in a groove, in particularly a frontal groove, as previously described.

It is particularly advantageous if the permanent magnet means are housed without an encapsulation medium in a frontal recess, in particular, for example, in a circular or elliptical annular groove which extends in the circumferential direction. Such an embodiment is advantageous in particular when the permanent magnet elements of the permanent magnet means are adjacent to each other in the circumferential direction, i.e. either directly adjoining each other or spaced less than 2 mm apart from each other in the circumferential direction.

In the prior art the permanent magnet means are typically formed by circular-cylindrical, disc-shaped rare earth magnets. In particular in the case of an embodiment having adjacent permanent magnet elements, it is advantageous for optimal utilization of the installation space if the permanent magnet means have a ring segment contour, in particular a circular ring segment contour or an elliptical ring segment contour, which is particularly preferred. Such permanent magnet elements can have a cylindrical design, i.e. having parallel outer surface sections or outer surfaces that are bevelled in the axial direction.

As already mentioned, it is conceivable that the permanent magnet elements which adjoin each other in the circumferential direction are spaced apart from each other by a thin adhesive layer. It is particularly advantageous, however, if the adjoining permanent magnets each directly adjoin each other with contact surfaces which lie in a radial plane relative to an axis of rotation of the device.

To minimize the assembly costs and to obtain an optimal utilization of the surface area it is advantageous if, for the case where the permanent magnet means are designed as shaped plastic parts or shaped sintered parts, the shaped plastic parts or shaped sintered parts each have either a closed annular shape, such as a circle or an ellipse, or each extend in the circumferential direction over at least 45°, preferably over at least 90° or preferably over at least 120° about the axis of rotation, in particular in the shape of a ring segment, such as a circular shaped ring segment or elliptically shaped ring segment.

It is particularly preferable for the case implemented as an, in particular concentric, geometric annular orbit, more preferably by one which deviates from a concentric circular orbit, that this annular orbit is designed to be mirror symmetrical, for example as an elliptical orbit.

As already suggested above, it is advantageous for transmitting particularly large torques if both the output drive means as well as the drive means carry permanent magnet means, wherein the permanent magnet means are located facing the components, in particular observing a small axial gap, and in particular on identically designed annular orbits. However, it is also possible to provide only the drive means or only the output drive means with permanent magnet means, and opposite them to provide a section of material which is assigned thereto and conducts the magnetic flux, in particular a material insert, i.e. a magnetic material received in a recess, wherein the insert can be formed, for example, from steel or a soft ferrous material.

There are many different constructional options for the design of the torque transmission device. In principle it is possible that the drive means and the output drive means each only comprise one torque transmission disc, which are located opposite each other, wherein permanent magnet means are provided on at least one of the end faces of the torque transmission discs which face each other. The torque transmission discs can rotate relative to each other about the common rotational axis and are arranged opposite to each other, maintaining an axial gap. Alternatively, in order to increase the power density it is conceivable that the drive means or the output drive means comprise at least two rotary torque transmission discs that are spaced axially apart and connected together in a rotationally fixed manner, which each receive one torque transmission disc of the respective other means, i.e. the output drive means or the drive means, between themselves in the manner of a sandwich. On both axial end faces of the torque transmission disc which is arranged between two torque transmission discs, permanent magnet means are preferably provided, or alternatively flux-conducting material, in particular in the form of a material insert, for example a steel insert.

A particularly preferred embodiment is one in which the relative rotation ability of the drive and output drive means is limited by at least one mechanical interlocking driving connection, wherein such a connection can also be omitted. The provision of a mechanical interlocking driving connection is particularly advantageous in the implementation of the option with an annular orbit which deviates in shape from a concentric circular orbit, along which the permanent magnet means are arranged, since in such an arrangement there is sufficient space for simultaneously arranging both a suitable interlocking driving connection and permanent magnet means which extend out over a large radial distance, resulting in a large transmissible torque.

The invention also leads to a system having a device designed according to the concept of the invention for transmitting torques and for damping rotational vibrations, wherein the output drive means of the device is coupled to an auxiliary unit, in particular an alternator, more preferably in a motor vehicle, for example via a belt drive. In this case, the output drive means preferably carry a pulley. It is preferable to assign to the drive means of the device an internal combustion engine, which drives the drive means via a corresponding shaft.

BRIEF DESCRIPTION OF THE DRAWINGS

Further advantages, features and details of the invention can be found in the following description of preferred exemplary embodiments and from the drawings.

These show:

FIGS. 1 to 8 different views of a device for transmitting torques and for damping rotational vibrations, and of individual components of said device, FIG. 9 a sectional view of an alternative embodiment having a sandwich-like arrangement of drive means and output drive means, and FIGS. 10 and 11 an embodiment of output drive and drive means with permanent magnet means arranged along concentric elliptical orbits In the figures, equivalent elements and elements with the same function are assigned the same reference numeral.

DETAILED DESCRIPTION

Figure 9:
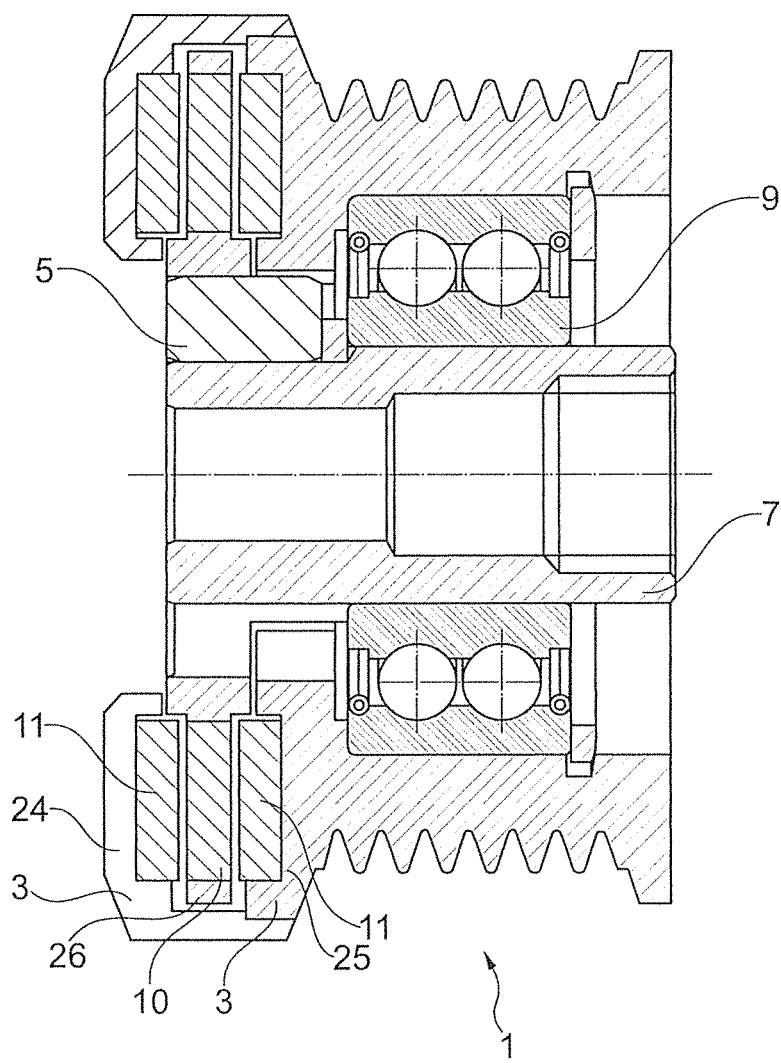

FIGS. 1 to 8 show, in partial sectional views and in detail views, an exemplary embodiment of a device 1 for transmitting torques and for damping rotational vibrations, in which both drive means 2 powered by an internal combustion engine and the output drive means 3 assigned thereto each comprise a disc carrying permanent magnet means (torque transmission disc).

The drive means 2 and output drive means 3 are rotatable about a common axis of rotation 4, wherein the relative rotational ability is limited by two interlocking driving connections 5, 6. In the exemplary embodiment shown, a relative rotational ability around a segment of rotation of ±20° is implemented.

As can be seen in particular from a comparison of FIGS. 3 and 4, the interlocking driving connections 5, 6 are located on a concentric circular orbit with respect to the common axis of rotation 4.

From FIG. 2 it can be seen that the drive means 2 are connected in a rotationally fixed manner to a shaft 7 that can be driven by the internal combustion engine, not shown, while the output drive means 3, which are designed as a pulley 8 for coupling to an auxiliary unit, in particular to an alternator, can be rotated relative to the shaft 7 via a rolling bearing 9, here designed as a double-roller bearing.

The drive means 2 and the output drive means 3 each carry on their end face permanent magnet means 10, 11, wherein the permanent magnet means 10, 11 are located axially opposite, maintaining an axial gap 12. The poles 13, 14, 15, 16 of the permanent magnet means 10, 11 are oriented axially, i.e. they are located in a radial plane with respect to the axis of rotation 4.

FIG. 5 clearly shows the arrangement of the permanent magnet means 11. It is evident that in the exemplary embodiment shown, the permanent magnet means 11 (and also the permanent magnet means 10) are formed by permanent magnet elements 17, for example by a rare-earth material, wherein the permanent magnet elements 17 of the drive means and output drive means are also each arranged on a concentric annular orbit about the axis of rotation 4, the polarity changing alternately in the circumferential direction. It is also evident that the permanent magnet elements 17 in the specific exemplary embodiment have a circular ring-segment shape.

The permanent magnet elements 17 adjoin one another in the circumferential direction. In the specific exemplary embodiment, contact surfaces 18, 19, which face each other and lie in a radial plane, are touching, wherein a thin layer of adhesive can alternatively be provided between these contact surfaces 18, 19.

The permanent magnet elements 17 here are received in an annular frontal groove 20, wherein the groove is designed as a multi-tiered groove and has a central recessed groove section 21 for receiving adhesive. The permanent magnet elements 17 are supported on the groove base internally and radially externally in a groove section, which is not recessed to the maximum width.

As can be seen from FIG. 5, the permanent magnets 17 are grouped in at least approximately semi-circular groups. The spacing between these groups in the circumferential direction is due to manufacturing tolerances of the permanent magnets 17. In the best case the available surface area is completely filled with permanent magnet means, which can be implemented ideally by shaped parts made of permanent magnets, in particular magnetic elements made of sintered material, or more preferably, via shaped magnetic parts made of plastic, in particular injection-moulded magnetic parts made of plastic.

FIG. 5 also shows an (upper) assembly marking to enable a simplified assembly.

The exemplary embodiment shown in FIG. 9 is substantially the same as the exemplary embodiment according to those in FIGS. 1 to 8, so that to avoid repetitions essentially only the differences will be discussed.

It can be identified that the output drive means 3 in the exemplary embodiment shown have 2 axially spaced torque transmission discs 24, 25, which in the exemplary embodiment shown are radially connected to each other on the outside. The torque transmission discs 24, 25 each carry permanent magnet means 11.

Between the torque transmission discs 24, 25 of the output drive means a torque transmission disc 26 of the drive means is provided, which carries permanent magnet means 10 and which is received in a sandwich-like manner between the torque transmission discs 24, 25 of the output drive means, in each case maintaining an axial gap.

Figure 10:
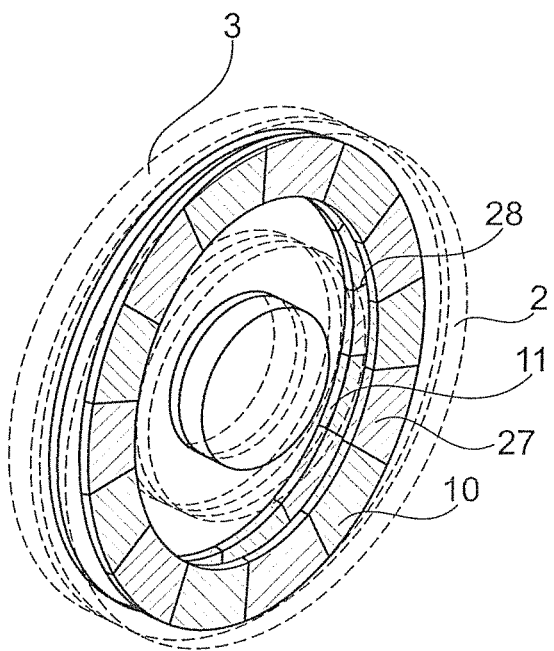
Figure 11:
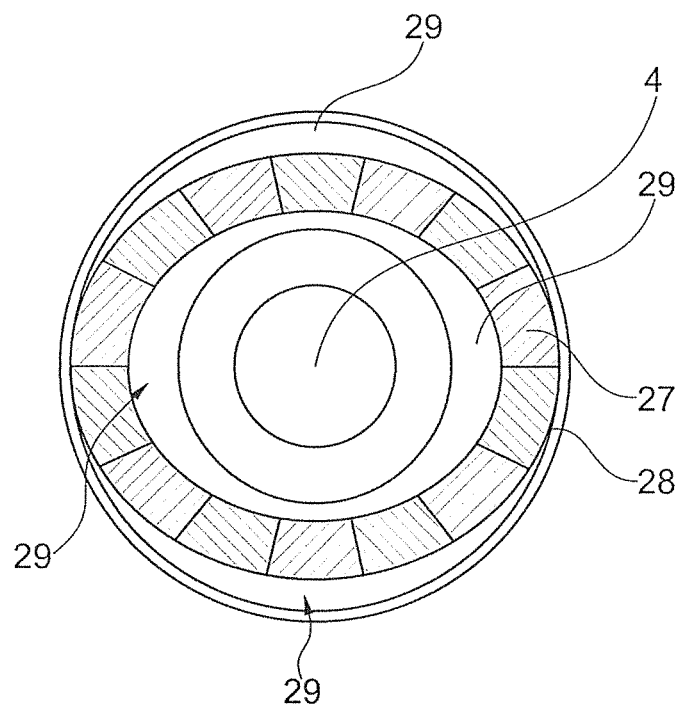

In FIGS. 10 to 11 an alternative method is shown for arranging permanent magnet means 10, 11 on the output drive means 3 and the drive means 2. In this case the permanent magnet means 10, 11 are arranged on an annular orbit 27 or 28, which here is also concentric and deviates from a concentric circular orbit. The annular orbits 27, 28 have the same contours and are located axially opposite each other. In the specific exemplary embodiment the permanent magnet means 10, 11 are each formed by individual permanent magnet elements, but can be alternatively designed, as explained in the general description section.

FIG. 11 shows the position of the elliptical annular orbits 27, 28 with respect to the rotational axis 4.

Due to the elliptical shape of the annular orbits and, as a consequence, the permanent magnet means, and preferably also of the recesses or cutouts, in particular grooves, which receive the permanent magnet means, a transmission characteristic which differs from the prior art is obtained. In particular, space is created in the surface region labelled with reference numeral 29 for optional interlocking driving connections, not shown, for limiting the rotational ability of the drive means and the output drive means relative to each other.

In the specific exemplary embodiment it is provided that the permanent magnet elements of the permanent magnet means adjoin each other in the circumferential direction, but this is not essential in order to implement the elliptical annular orbits.

In all exemplary embodiment, permanent magnet means located opposite each other are provided. It is also possible to replace permanent magnet means on one side (output drive side or drive side) by flux-conductive material, in particular a material insert (received in a recess).

The invention claimed is:

1. A device (1) for transmitting torque for driving an auxiliary unit, in particular an alternator and for damping torsional vibrations, said device comprising:
   driving means (2) that can be driven about an axis of rotation (4) by an internal combustion engine,
   output drive means (3) rotatable about the axis of rotation (4) that are arranged and designed for driving the auxiliary unit, wherein
   at least one axial front face of the driving means (2) and/or of the output drive means (3) carries permanent magnet means (10, 11) which allow torques to be transmitted between the driving means (2) and the output drive means (3) and which allow torsional vibrations to be dampened, poles (13, 14, 15, 16) of the permanent magnet means (10, 11) being arranged in at least one radial plane,
   wherein
   (i) the permanent magnet means (10, 11) comprise a plurality of permanent magnet elements (17) arranged next to each other in the circumferential direction, these permanent magnets (17) adjoining each other directly in contact or fixed to each other via an adhesive layer of less than 2 mm thickness,
   and/or wherein
   (ii) the permanent magnet means (10, 11) comprise at least one shaped part made of plastic, in particular an injection-moulded part made of plastic and/or a shaped part made of a sintered material,
   and/or wherein
   (iii) the permanent magnet means (10, 11) are arranged on a geometrical circular orbit,
   and wherein
   relative rotation of the drive means (2) and output drive means (3) is further limited by at least one mechanical interlocking driving connection (5, 6), wherein a plurality of mechanical interlocking driving connections (5, 6) are arranged on an annular orbit which extends concentrically to the rotational axis (4) or on a non-circular annular orbit and limit relative rotational ability of the drive means (2) and the output drive means (3) around a segment of rotation.

2. The device according to claim 1, wherein the permanent magnet means (10, 11) are adhesively bonded and/or mechanically fixed, in particular caulked, to the drive means (2) and/or the output drive means (3).

3. The device according to claim 1, wherein the permanent magnet means (10, 11) are accommodated in the drive means (2) and/or the output drive means (3) without an encapsulation medium in a frontal recess, in particular a groove (20), which extends in the circumferential direction.

4. The device according to claim 1, wherein the adjacent permanent magnet elements (17) of the permanent magnet means (10, 11) have a ring segment contour, in particular a circular ring segment contour or elliptical ring segment contour.

5. The device according to claim 1, wherein the adjacent permanent magnet elements (17) adjoin each other each with a contact surface (18, 19) which lies in a radial plane relative to an axis of rotation (4) of the device.

6. The device according to claim 1, wherein the at least one plastic shaped part has an annular shape, in particular a circular or an elliptical annular shape, or a ring segment shape that extends over a peripheral angle of at least 45°, around the axis of rotation (4), in particular a circular ring segment shape or an elliptical ring segment shape.

7. The device according to claim 1, wherein the permanent magnet elements (17) and/or the permanent magnet means (10, 11), arranged on a annular orbit which deviates from a circular annular orbit (27, 28), are formed from a permanent-magnetic solid material, and/or designed as shaped parts made of plastic and/or as shaped parts made of sintered material.

8. The device according to claim 1, wherein the geometric, annular orbit (27, 28) which deviates from a concentric circular orbit, is mirror symmetrical.

9. The device according to claim 1, wherein only the drive means (2) comprise permanent magnet means (10, 11) for transmitting torque and the output drive means (3) comprise a section of material assigned to said means, in particular a material insert, made of a material which conducts the magnetic flux, or vice versa.

10. The device according to claim 1, wherein the drive means (2) and the output drive means (3) each have only one torque transmission disc (24, 25), wherein the torque transmission discs are located axially opposite each other, in particular with an intermediate gap (12), or wherein the drive means (2) comprise at least two torque transmission discs, which each receive a torque transmission disc of the output drive means (3) between themselves in the manner of a sandwich, or wherein the output drive means (3) comprise at least two torque transmission discs, which each receive one torque transfer disc of the drive means (2) between themselves in the manner of a sandwich.

11. A system having a device according to claim 1, which is coupled in a torque-transmitting manner to an auxiliary unit, in particular an alternator in a motor vehicle.

12. The device according to claim 1, wherein the alternator is in a motor vehicle.

13. The device according to claim 1, wherein the permanent magnet means (10, 11) are arranged on a concentric annular orbit.

14. The device according to claim 1, wherein the permanent magnet means (10, 11) are arranged on an elliptical orbit.

15. The device according to claim 6, wherein the at least one plastic shaped part extends over a peripheral angle of at least 90°.

16. The device according to claim 6, wherein the at least one plastic shaped part extends over a peripheral angle of at least 120°.

* * * * *